United States Patent
Isono et al.

(10) Patent No.: US 10,408,085 B2
(45) Date of Patent: Sep. 10, 2019

(54) TURBOCHARGER

(71) Applicant: IHI Corporation, Koto-ku (JP)

(72) Inventors: Yuusuke Isono, Tokyo (JP); Kiyomichi Ichikawa, Tokyo (JP); Atsushi Mori, Tokyo (JP); Yuji Kobayashi, Tokyo (JP); Kazuaki Iwata, Tokyo (JP)

(73) Assignee: IHI Corporation, Koto-ku (JP)

( * ) Notice: Subject to any disclaimer, the term of this patent is extended or adjusted under 35 U.S.C. 154(b) by 347 days.

(21) Appl. No.: 15/362,351

(22) Filed: Nov. 28, 2016

(65) Prior Publication Data
US 2017/0074115 A1   Mar. 16, 2017

Related U.S. Application Data

(63) Continuation of application No. PCT/JP2015/065977, filed on Jun. 3, 2015.

(30) Foreign Application Priority Data

Jun. 9, 2014   (JP) ................. 2014-119080

(51) Int. Cl.
*F01D 25/24*   (2006.01)
*F04D 29/056*   (2006.01)
(Continued)

(52) U.S. Cl.
CPC ........... *F01D 25/04* (2013.01); *F01D 17/105* (2013.01); *F01D 17/148* (2013.01); *F01D 25/16* (2013.01);
(Continued)

(58) Field of Classification Search
CPC ...... F01D 25/04; F01D 17/105; F01D 17/148; F01D 25/16; F01D 25/24; F02C 6/12;
(Continued)

(56) References Cited

U.S. PATENT DOCUMENTS 1,001,677 A * 8/1911 Ostergren ........... F04C 15/0042
                                                418/196
2,386,896 A * 10/1945 Hill ..................... F04C 18/10
                                                384/291
(Continued)

FOREIGN PATENT DOCUMENTS

CN   102678201 A    9/2012
JP   8-334030    12/1996
(Continued)

OTHER PUBLICATIONS

International Search Report dated Sep. 8, 2015 in PCT/JP2015/065977, filed on Jun. 3, 2015 (with English Translation).
(Continued)

*Primary Examiner* — J. Todd Newton
(74) *Attorney, Agent, or Firm* — Oblon, McClelland, Maier & Neustadt, L.L.P.

(57) ABSTRACT

A turbocharger includes: a turbine housing including an internal space formed therein; a bearing portion provided in the turbine housing; a shaft rotatably inserted into a bearing hole in a state where at least one end protrudes more to an inside of the turbine housing than the bearing portion; and a valve fixed to the shaft and configured to open and close a flow path opened to the internal space. The bearing portion includes a protrusion portion which protrudes from an inner wall of the turbine housing. The radial hole of the protrusion portion penetrates the bearing portion in a radial direction of the shaft, from the outer circumferential surface of the bearing portion to the bearing hole.

9 Claims, 4 Drawing Sheets

(51) Int. Cl.
*F01D 25/04* (2006.01)
*F01D 25/16* (2006.01)
*F04D 29/053* (2006.01)
*F04D 29/42* (2006.01)
*F04D 29/66* (2006.01)
*F04D 27/02* (2006.01)
*F02B 37/18* (2006.01)
*F01D 17/10* (2006.01)
*F01D 17/14* (2006.01)
*F02C 6/12* (2006.01)

(52) U.S. Cl.
CPC ............ *F01D 25/24* (2013.01); *F02B 37/186* (2013.01); *F02C 6/12* (2013.01); *F04D 27/0215* (2013.01); *F04D 29/053* (2013.01); *F04D 29/056* (2013.01); *F04D 29/4206* (2013.01); *F04D 29/668* (2013.01); *F05D 2220/40* (2013.01); *F05D 2240/35* (2013.01); *F05D 2240/60* (2013.01); *Y02T 10/144* (2013.01)

(58) Field of Classification Search
CPC .. F02B 37/186; F04D 27/0215; F04D 29/056; F04D 29/668; F04D 29/4206; F04D 29/053; Y02T 10/144; F05D 2240/35; F05D 2240/60; F05D 2220/40
USPC ............................ 415/145; 29/898.2; 418/73
See application file for complete search history.

(56) References Cited

U.S. PATENT DOCUMENTS

| | | | | |
|---|---|---|---|---|
| 2,479,077 | A * | 8/1949 | McAlvay | F04C 15/0042 418/102 |
| 2,660,484 | A * | 11/1953 | Paul | F16C 32/0659 29/898.02 |
| 3,134,336 | A * | 5/1964 | Huffman | F04C 15/0042 29/898.02 |
| 3,350,145 | A * | 10/1967 | Le Nabour | F16C 32/0651 384/111 |
| 3,528,756 | A * | 9/1970 | Keresman, Jr. | F01C 21/02 418/102 |
| 6,532,663 | B2 * | 3/2003 | Brune | F16C 32/0659 29/898.02 |
| 8,628,247 | B2 | 1/2014 | Uesugi | |
| 9,574,456 | B2 * | 2/2017 | Murayama | F02B 37/183 |
| 9,790,950 | B2 * | 10/2017 | Uneura | F16C 33/1065 |
| 2012/0228833 | A1 | 9/2012 | Delitz | |
| 2013/0089411 | A1 * | 4/2013 | Ward | F01D 17/165 415/151 |
| 2014/0144135 | A1 * | 5/2014 | Gupta | F01D 11/00 60/602 |
| 2015/0097345 | A1 | 4/2015 | House et al. | |
| 2015/0184541 | A1 * | 7/2015 | Iizuka | F16C 33/121 415/229 |
| 2015/0330292 | A1 * | 11/2015 | Keller | F01D 17/12 415/145 |
| 2016/0069253 | A1 * | 3/2016 | Christmann | F01D 17/20 415/145 |
| 2017/0175619 | A1 * | 6/2017 | Hastings | F02B 37/186 |
| 2018/0193967 | A1 * | 7/2018 | Ruh | B23P 23/04 |

FOREIGN PATENT DOCUMENTS

| | | |
|---|---|---|
| JP | 2008-82211 A | 4/2008 |
| JP | 2009-30474 | 2/2009 |
| JP | 2013-15102 | 1/2013 |
| JP | 2013-512373 | 4/2013 |
| WO | WO 2013/173055 A1 | 11/2013 |

OTHER PUBLICATIONS

Written Opinion dated Sep. 8, 2015 in PCT/JP2015/065977, filed on Jun. 3, 2015.
Combined Office Action and Search Report dated May 4, 2018 in Chinese Patent Application No. 201580029218.2 With English translation of categories of cited documents, 6 pages.

* cited by examiner

TURBOCHARGER

CROSS REFERENCE TO RELATED APPLICATIONS

This application is a continuation application of International Application No. PCT/JP2015/065977, filed on Jun. 3, 2015, which claims priority to Japanese Patent Application No. 2014-119080, filed on Jun. 9, 2014, the entire contents of which are incorporated by reference herein.

BACKGROUND

1. Technical Field

The present disclosure relates to a turbocharger including a valve that opens and closes a flow path open to an internal space of a housing.

Conventionally, there is known a turbocharger in which a rotation shaft where a turbine impeller is provided at one end and a compressor impeller is provided at the other end is rotatably held in a bearing housing. Such a turbocharger is connected to an engine, the turbine impeller is rotated by an exhaust gas discharged from the engine and the compressor impeller is rotated by the rotation of the turbine impeller via the rotation shaft. In this way, along with the rotation of compressor impeller, the turbocharger compresses air and feeds it out to the engine.

The turbocharger disclosed in Japanese Patent Application Laid-Open Publication (Translation of PCT Application) No. 2013-512373 (Patent Literature 1) includes a bypass flow path. The bypass flow path passes a part of an exhaust gas from a turbine housing to the downstream side of a turbine impeller not via a turbine scroll flow path communicating with the turbine impeller. Namely, the part of the exhaust gas passes through the bypass flow path to thereby bypass the turbine scroll flow path and the turbine impeller. The bypass flow path is opened and closed by a valve. The valve is provided within the turbine housing and is coupled to a shaft. The shaft is rotatably supported by a bearing portion provided in the turbine housing. The bearing portion is placed in the turbine housing so as to penetrate through the inside and outside of the turbine housing. As described above, when the shaft is rotated by the power of an actuator, the valve is operated together with the shaft, and thus the bypass flow path is opened and closed by the operation of the valve.

SUMMARY

When as described above, the bearing portion is provided in the housing of the turbocharger, and the shaft is rotatably supported by the bearing portion, the shaft is vibrated in the axial direction thereof, due to the influence of exhaust pulsation or the like, with the result that a noise may be produced.

An object of the present disclosure is to provide a turbocharger which can suppress the vibration of a shaft and the like that operate a valve and an abnormal noise caused by the vibration.

In order to solve the problem described above, according to a first aspect of the present disclosure, there is provided a turbocharger including: a housing including an internal space formed therein; a bearing portion provided in the housing, the bearing portion being provided with a bearing hole penetrating from the internal space of the housing to an outside of the housing; a shaft rotatably supported in the bearing hole, of the shaft protruding more to an inside of the housing than the bearing portion; and a valve fixed to the shaft, configured to open and close a flow path opened to the internal space along with rotation of the shaft, wherein the bearing portion includes a protrusion portion which protrudes from an inner wall of the housing facing the internal space, and the protrusion portion is provided with a radial hole penetrating in a radial direction of the shaft from an outer circumferential surface of the bearing portion to the bearing hole.

The cross-sectional area of the radial hole orthogonal to a penetrating direction of the radial hole may be larger than a cross-sectional area of a gap, in the radial direction of the shaft, which is formed between an inner circumferential surface of the bearing portion forming the bearing hole and an outer circumferential surface of the shaft.

The radial hole may be provided in a position in which an extension line extending in the penetrating direction of the radial hole does not intersect a movable locus range of the valve.

The bearing portion may be formed in a cylindrical shape, a plurality of the radial holes may be provided at intervals in a circumferential direction of the bearing portion, and intervals between the radial holes may be non-uniform.

According to the present disclosure, it becomes possible to suppress the vibration of a shaft that operates a valve and an abnormal noise caused by the vibration.

BRIEF DESCRIPTION OF THE DRAWINGS

FIG. 2A is a view when a discharge port of the turbine housing is seen from the front and FIG. 2B is a side view of the turbine housing.

FIG. 3A is a perspective view of the attaching plate according to the embodiment of the present disclosure, FIG. 3B is a side view of the attaching plate according to the present embodiment, and FIG. 3C is a top view of the attaching plate according to the present embodiment.

FIG. 5A is a cross-sectional view including the bearing portion and the center axis of the shaft, and FIG. 5B is a view when seen in the direction of an arrow V(b) in FIG. 5A.

FIG. 7A is a cross-sectional view including the bearing portion and the center axis of the shaft and FIG. 7B is a view when seen in the direction of an arrow VII(b) in FIG. 7A.

DESCRIPTION OF THE EMBODIMENTS

An embodiment of the present disclosure will be described in detail below with reference to accompanying drawings. Dimensions, materials, specific values and the like indicated in the embodiment are simply examples for facilitating the understanding of the disclosure and do not limit the present disclosure unless otherwise particularly specified. Note that, in the present specification and drawings, the same symbols are attached to elements which have substantially the same functions and configurations, and thus the repeated descriptions thereof are omitted and elements which are not directly related to the present disclosure are not illustrated.

Figure 1:
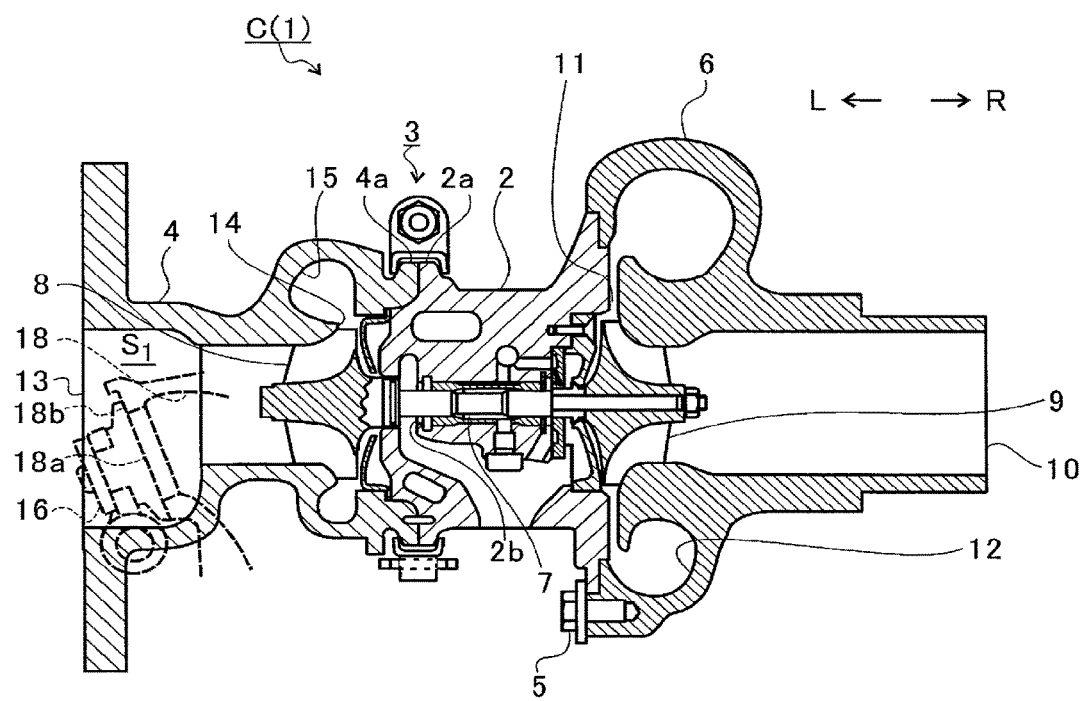
FIG. 1 is a schematic cross-sectional view of a turbocharger according to an embodiment of the present disclosure.

FIG. 1 is a schematic cross-sectional view of a turbocharger C. In the following description, it is assumed that an arrow L shown in FIG. 1 is a direction which indicates the left side of the turbocharger C and that an arrow R is a direction which indicates the right side of the turbocharger C. As shown in FIG. 1, the turbocharger C includes a turbocharger main body 1. The turbocharger main body 1 includes a bearing housing 2, a turbine housing 4 which is coupled to the left side of the bearing housing 2 through the use of a fastening mechanism 3 and a compressor housing 6 which is coupled to the right side of the bearing housing 2 through the use of a fastening bolt 5. They are integrally formed.

A protrusion 2a is provided on the outer circumferential surface of the bearing housing 2 in the vicinity of the turbine housing 4. The protrusion 2a protrudes in the radial direction of the bearing housing 2. Furthermore, a protrusion 4a is provided on the outer circumferential surface of the turbine housing 4 in the vicinity of the bearing housing 2. The protrusion 4a protrudes in the radial direction of the turbine housing 4. The bearing housing 2 and the turbine housing 4 are fixed by band-fastening the protrusions 2a and 4a through the use of the fastening mechanism 3. The fastening mechanism 3 is constituted of a fastening band (for example, G coupling) which sandwiches the protrusions 2a and 4a.

In the bearing housing 2, a through-hole 2b penetrating through the turbocharger C in the left/right direction is formed. In the through-hole 2b, a rotation shaft 7 is rotatably supported. A turbine impeller 8 is integrally fixed to the left end portion of the rotation shaft 7. The turbine impeller 8 is rotatably stored within the turbine housing 4. Further, a compressor impeller 9 is integrally fixed to the right end portion of the rotation shaft 7. The compressor impeller 9 is rotatably stored within the compressor housing 6.

A suction port 10 is formed in the compressor housing 6. The suction port 10 is open to the right side of the turbocharger C and is connected to an air cleaner (not shown). Furthermore, in a state where the bearing housing 2 and the compressor housing 6 are coupled to each other with the fastening bolt 5, facing surfaces of both the housings 2 and 6 facing each other form a diffuser flow path 11 which compresses air to raise the pressure thereof. The diffuser flow path 11 is formed in the shape of a ring from the inside to the outside of the rotation shaft 7 (the compressor impeller 9) in the radial direction. The diffuser flow path 11 communicates with the suction port 10 via the compressor impeller 9, in the inside in the radial direction.

Moreover, the compressor housing 6 is provided with a compressor scroll flow path 12. The compressor scroll flow path 12 is annularly formed and is located on an outer side of the rotation shaft 7 (the compressor impeller 9) in the radial direction from the diffuser flow path 11. The compressor scroll flow path 12 communicates with a suction port (not shown) of an engine. In addition, the compressor scroll flow path 12 also communicates with the diffuser flow path 11. Therefore, when the compressor impeller 9 is rotated, air is sucked from the suction port 10 into the compressor housing 6, the pressure of the air is raised in the diffuser flow path 11 and the compressor scroll flow path 12, and the resultant air is guided to the suction portion of the engine.

A discharge port 13 is formed in the turbine housing 4. The discharge port 13 is open to the left side of the turbocharger C and is connected to an exhaust gas purification device (not shown). The turbine housing 4 has an internal space S which includes the discharge port 13 as one end. In the internal space $S_1$, a valve 16 which will be described later is arranged. Furthermore, the turbine housing 4 is provided with an internal flow path 14 and a turbine scroll flow path 15. The turbine scroll flow path 15 is annularly formed and is located on an outer side of the rotation shaft 7 (the turbine impeller 8) in the radial direction from the internal flow path 14. The turbine scroll flow path 15 communicates with a gas inlet 17 (see FIG. 2B) to which an exhaust gas discharged from the exhaust manifold (not shown) of the engine is guided. In addition, the turbine scroll flow path 15 also communicates with the internal flow path 14. Therefore, the exhaust gas is guided from the gas inlet 17 to the turbine scroll flow path 15 and is guided to the discharge port 13 via the internal flow path 14, the turbine impeller 8 and the internal space $S_1$. In this distribution process, the exhaust gas rotates the turbine impeller 8. The rotation force of the turbine impeller 8 is transmitted through the rotation shaft 7 to the compressor impeller 9, and thus the compressor impeller 9 is rotated. The pressure of the air is raised by the rotation force of the compressor impeller 9, and the air is guided to the suction port of the engine.

Figure 2A:
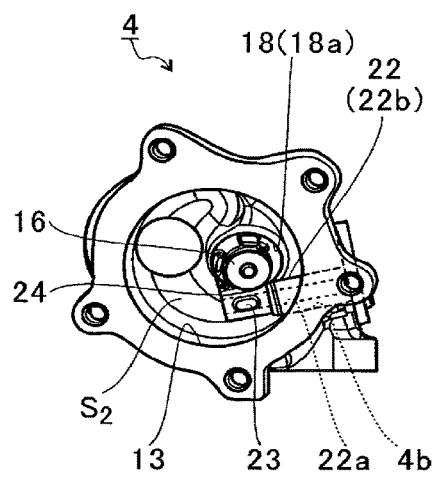
FIGS. 2A and 2B are external views of a turbine housing according to the embodiment of the present disclosure.
Figure 2B:
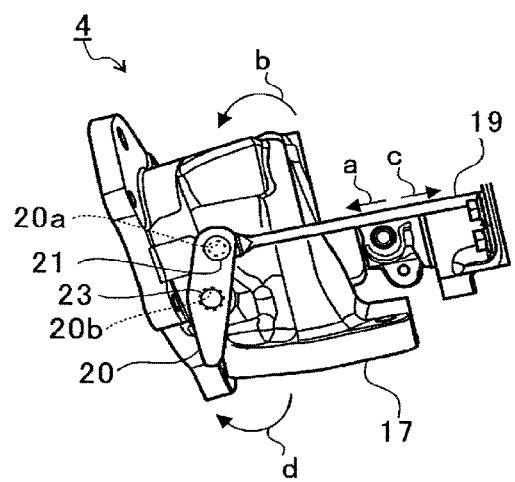

FIGS. 2A and 2B are external views of the turbine housing 4. FIG. 2A is a view when the discharge port 13 of the turbine housing 4 is seen from the front. FIG. 2B is a side view of the turbine housing 4. In FIG. 2B, the gas inlet 17 is open substantially to the lower side of the turbine housing 4. The flow path communicating from the gas inlet 17 to the turbine scroll flow path 15 is branched on the upstream side of the turbine scroll flow path 15. Furthermore, as shown in FIG. 1, the exit end 18a of a bypass flow path 18 (flow path) which is the branched flow path is formed on the wall surface (inner wall) of the turbine housing 4 which forms the internal space S including the discharge port 13.

The exhaust gas flows in from the gas inlet 17, and a part thereof can flow out, through the bypass flow path 18, into the internal space S located downstream of the turbine impeller 8. Namely, the part of the exhaust gas can bypass the turbine impeller 8 and the turbine scroll flow path 15.

The valve 16 is constituted of a valve member whose outside diameter is larger than the inside diameter of the exit end 18a. The valve 16 makes contact with a sheet surface 18b formed around the exit end 18a of the bypass flow path 18 to thereby close the bypass flow path 18, and separates from the sheet surface 18b to thereby open the bypass flow path 18.

An actuator rod 19 shown in FIG. 2B is arranged outside the turbine housing 4. One end of the actuator rod 19 is fixed to an actuator (not shown), and the actuator rod 19 is operated in the axial direction by the power of the actuator. The other end of the actuator rod 19 is fixed to a pin rod 21 protruding in a direction orthogonal to the axial direction of the actuator rod 19.

A link plate 20 is constituted of a plate member. A link hole 20a is formed at one end of the link plate 20. The pin rod 21 is rotatably inserted (supported) into the link hole 20a of the link plate 20. Namely, the pin rod 21 is fixed to the actuator rod 19 and is rotatably supported by the link plate 20.

Therefore, when as shown in FIG. 2B, the actuator rod 19 operates in a direction indicated by an arrow a, the link plate 20 is swung in a direction indicated by an arrow b. On the other hand, when the actuator rod 19 operates in a direction indicated by an arrow c, the link plate 20 is swung in a direction of an arrow d.

Furthermore, as shown in FIG. 2A, a housing hole 4b is formed in the turbine housing 4. The housing hole 4b penetrates between the outside (the turbine housing 4 on the side of the actuator rod 19) of the turbine housing 4 and the internal space S of the turbine housing 4. A bearing portion 22 is press-fitted into the housing hole 4b.

The bearing portion 22 is constituted of a cylindrical member. The bearing portion 22 has a bearing hole 22a penetrating from one end to the other end thereof. A shaft 23 is inserted into the bearing hole 22a. Furthermore, the one end of the bearing portion 22 serves as a protrusion portion 22b which protrudes from the inner wall of the turbine housing 4 forming the internal space S. The other end of the bearing portion 22 protrudes to the outside of the turbine housing 4. Namely, the one end of the bearing portion 22 is located in the internal space S, and the other end of the bearing portion 22 is located outside the turbine housing 4.

As described above, the one end of the bearing portion 22 protrudes into the internal space $S_1$ of the turbine housing 4, and the other end of the bearing portion 22 protrudes to the outside of the turbine housing 4. Namely, the bearing hole 22a of the bearing portion 22 penetrates between the inside (the internal space S) of the turbine housing 4 and the outside of the turbine housing 4.

As described above, the shaft 23 is inserted into the bearing hole 22a of the bearing portion 22, and is rotatably supported by the bearing portion 22. One end of the shaft 23 protrudes more to the side of the internal space $S_1$ of the turbine housing 4 than the bearing portion 22. Namely, in a state where the one end of the shaft 23 is located in the internal space $S_1$, the shaft 23 is rotatably supported by the bearing hole 22a. Furthermore, the other end of the shaft 23 protrudes more to the outside of the turbine housing 4 than the bearing portion 22. In a state where the other end of the shaft 23 is inserted into a fixing hole 20b provided in the vicinity of the center of the link plate 20, the other end of the shaft 23 is welded to the link plate 20.

An attaching plate 24 is constituted of a plate member, and couples the valve 16 and the shaft 23 together. The valve 16 is provided on the side of one end of the attaching plate 24, and the shaft 23 is welded to the side of the other end of the attaching plate 24. A coupling structure of the attaching plate 24 and the valve 16 and a coupling structure of the attaching plate 24 and the shaft 23 will be described in detail later.

The valve 16 is integrally rotated by the attaching plate 24 together with the shaft 23 in the rotation direction of the shaft 23. As a result, when the actuator rod 19 operates in the axial direction (in FIG. 2B, the direction indicated by the arrows a and c), the shaft 23 is rotated along with the swing of the link plate (in FIG. 2B, the direction indicated by the arrows b and d). Then, the valve 16 opens and closes the exit end 18a of the bypass flow path 18 by the rotation of the shaft 23.

Figure 3A:
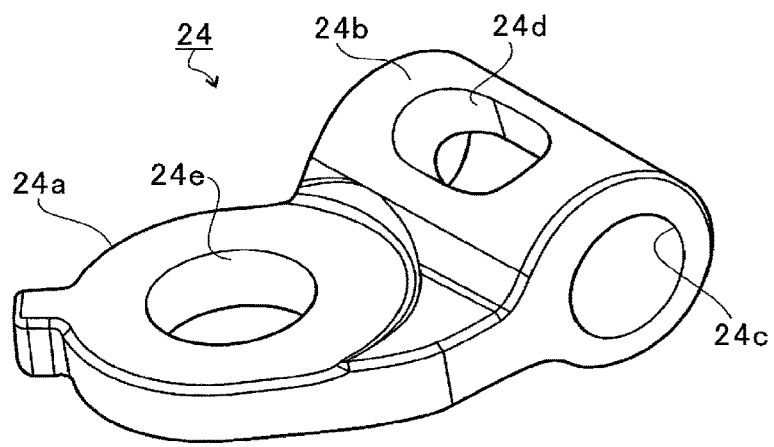
FIGS. 3A to 3C are views for illustrating an attaching plate according to the embodiment of the present disclosure.
Figure 3B:
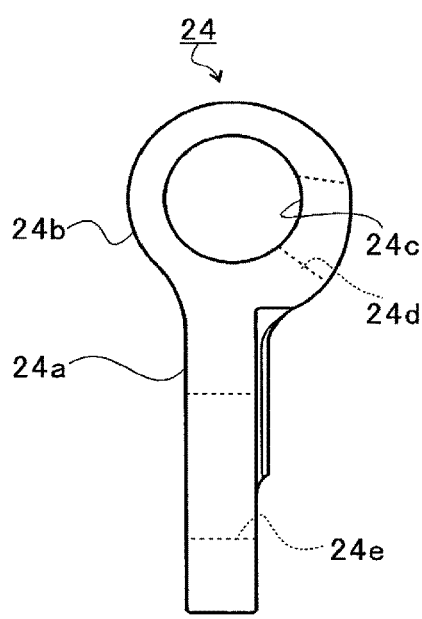
Figure 3C:
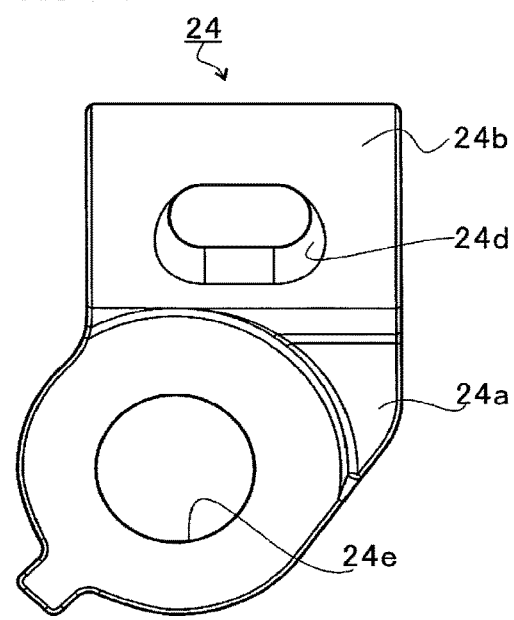

FIGS. 3A to 3C are views for illustrating the attaching plate 24. FIG. 3A is a perspective view of the attaching plate 24. FIG. 3B is a side view of the attaching plate 24. FIG. 3C is a top view of the attaching plate 24.

As shown in FIGS. 3A to 3C, the attaching plate 24 includes a main body portion 24a and a cylindrical cylinder portion 24b formed at one end of the main body portion 24a. The cylinder portion 24b is provided with an insertion hole 24c, and the shaft 23 is inserted into the insertion hole 24c.

An exposure hole 24d is formed in the cylinder portion 24b. The exposure hole 24d extends in the radial direction of the insertion hole 24c, and penetrates the insertion hole 24c from the outside of the cylinder portion 24b. When the shaft 23 is inserted into the insertion hole 24c, a part of the shaft 23 is exposed from the exposure hole 24d. In a state where the shaft 23 is inserted into the insertion hole 24c, the cylinder portion 24b of the attaching plate 24 is welded to the shaft 23 from the exposure hole 24d.

The main body portion 24a of the attaching plate 24 is provided with a main body hole 24e. The main body hole 24e penetrates the main body portion 24a in a direction orthogonal to the direction of the center axis of the insertion hole 24c. The attaching plate 24 and the valve 16 are coupled to each other via the main body hole 24e.

Figure 4:
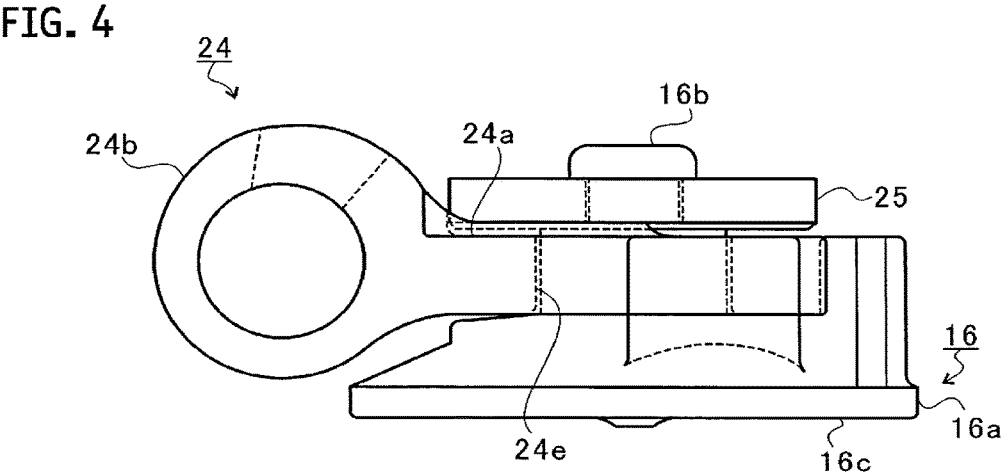
FIG. 4 is a view for illustrating the coupling structure of a valve to an attaching plate.

FIG. 4 is a view for illustrating the coupling structure of the valve 16 to the attaching plate 24, and is a view when the attaching plate 24 is seen from the side surface in a state where the attaching plate 24 and the valve 16 are coupled to each other. As shown in FIG. 4, a protrusion portion 16b is formed on the main body portion 16a of the valve 16. The protrusion portion 16b protrudes from the opposite side of a contact surface 16c making contact with the sheet surface 18b, in a direction orthogonal to the surface direction of the contact surface 16c. Note that the protrusion portion 16b may be formed integrally with the main body portion 16a or the protrusion portion 16b which is a separate member may be fixed to the main body portion 16a by welding or the like.

In a state where the main body portion 24a of the attaching plate 24 is sandwiched between the main body portion 16a of the valve 16 and a washer 25, the protrusion portion 16b of the valve 16 is inserted into the main body hole 24e of the attaching plate 24 and the washer 25. Thereafter, the attaching plate 24 and the valve 16 are coupled to each other by pressurizing, deforming and swaging the tip end of the protrusion portion 16b protruding from the washer 25.

Incidentally, in order to prevent the rotational movement of the shaft 23 from being inhibited, a gap of the shaft 23 in the radial direction is formed. Accordingly, the shaft 23 may be vibrated in the axial direction or in the radial direction to thereby produce a noise, due to the influence of exhaust pulsation or the like. Therefore, the bearing portion 22 of the present embodiment has a structure for suppressing such vibration.

Figure 5A:
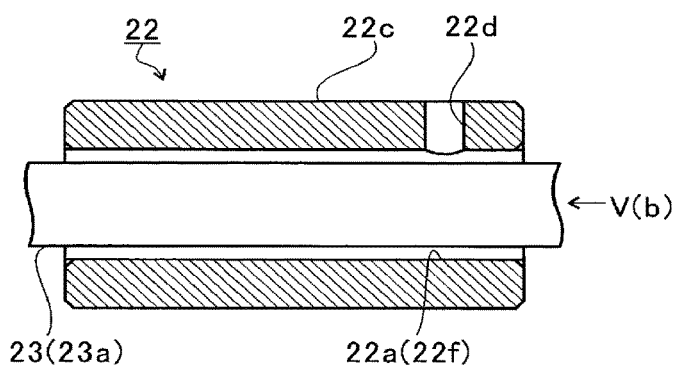
FIGS. 5A and 5B are views for illustrating a bearing portion and a shaft according to the embodiment of the present disclosure.
Figure 5B:
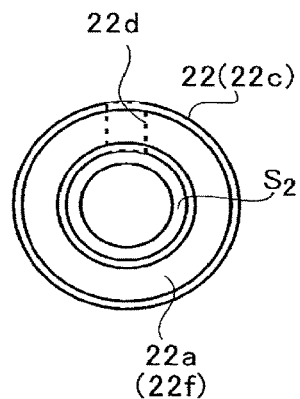

FIGS. 5A and 5B are views for illustrating the bearing portion 22 and the shaft 23. FIG. 5A is a cross-sectional view including the bearing portion 22 and the center axis of the shaft 23, and FIG. 5B is a view when seen in the direction of an arrow V(b) in FIG. 5A.

As shown in FIGS. 5A and 5B, a radial hole 22d is formed in the bearing portion 22. The radial hole 22d penetrates the bearing portion 22 in the radial direction of the shaft 23 from the outer circumferential surface 22c of the bearing portion 22 to the bearing hole 22a.

The inner circumferential surface 22f of the bearing portion 22 forms the bearing hole 22a. The outer circumferential surface 23a of the shaft 23 faces the inner circumferential surface 22f of the bearing portion 22 at a predetermined interval. Namely, a gap is formed between the outer circumferential surface 23a of the shaft 23 and the inner circumferential surface 22f of the bearing portion 22. The cross-sectional area of the gap in the radial direction of the shaft 23 (that is, the cross-sectional area in a direction perpendicular to the axial direction of the shaft 23) is equal to the area of a gap $S_2$ shown in FIG. 5B.

Here, the cross-sectional area of the radial hole 22d in a direction orthogonal to the penetrating direction (in FIGS. 5A and 5B, an up/down direction) of the radial hole 22d (the cross-sectional area of the radial hole 22d orthogonal to the penetrating direction of the radial hole 22d) is larger than the area of the gap $S_2$ shown in FIG. 5B.

Figure 6:
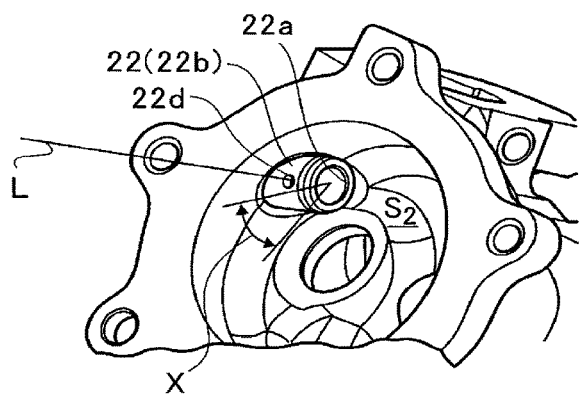
FIG. 6 is a view for illustrating the bearing portion assembled to a turbine housing.

FIG. 6 is a view for illustrating the bearing portion 22 assembled to the turbine housing 4. As shown in FIG. 6, the radial hole 22d is provided in the protrusion portion 22b of the bearing portion 22. Note that, as described above, the protrusion portion 22b is a portion of the bearing portion 22, which protrudes from the inner wall of the turbine housing 4.

The exhaust gas flows into the bearing hole 22a from the radial hole 22d, and presses a part of the shaft 23 exposed from the radial hole 22d and the vicinity thereof, in the radial direction. As a result, the shaft 23 is pressed onto a portion on the side opposite to a portion to which the radial hole 22d is open, in the inner circumferential surface 22f of the bearing portion 22.

The shaft 23 is pressed onto the inner circumferential surface 22f of the bearing portion 22, and thus a friction is generated between the outer circumferential surface 23a of the shaft 23 and the inner circumferential surface 22f of the bearing portion 22. The vibration of the shaft 23 in the axial direction is suppressed by this friction. Therefore, it is possible to suppress the vibration of the shaft 23 and an abnormal noise caused by the vibration.

As shown in FIG. 6, the radial hole 22d is provided in a position where an extension line L extending in the penetrating direction of the radial hole 22d does not intersect a movable locus range of the valve 16 (that is, a range specified by the locus of the valve 16). Accordingly, it is possible to suppress the lowering of the flow rate of exhaust gas passing through the radial hole 22d caused by interference with the valve 16 and to avoid a decrease in the pressing force that presses the shaft 23.

Figure 7A:
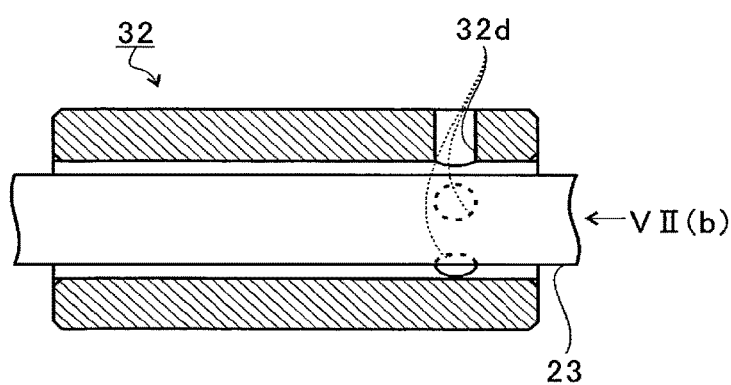
FIGS. 7A and 7B are views for illustrating a bearing portion and a shaft according to a modification of the embodiment of the present disclosure.
Figure 7B:
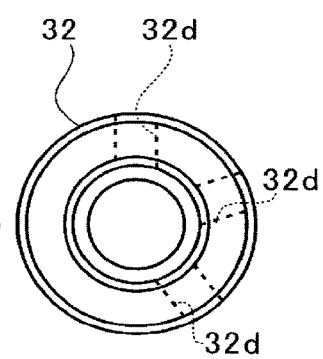

FIGS. 7A and 7B are views for illustrating a bearing portion 32 and a shaft 23 according to a modification. FIG. 7A is a cross-sectional view including the bearing portion 32 and the center axis of the shaft 23, and FIG. 7B is a view when seen in the direction of an arrow VII(b) in FIG. 7A.

As shown in FIGS. 7A and 7B, in the modification, a plurality of radial holes 32d is provided at intervals in the circumferential direction of the bearing portion 32. In addition, each of the intervals between the radial holes 32d is non-uniform in the circumferential direction. As described above, the radial holes 32d are arranged at non-uniform intervals and thus it is possible to acquire a larger area where the exhaust gas passing through the radial holes 32d presses the shaft 23 and to thereby further suppress the vibration of the shaft 23. At this time, the radial holes 32d are preferably arranged such that the pressing force to the shaft 23 by the exhaust gas is not cancelled and that the radial holes 32d are not located on both sides sandwiching the shaft 23. In other words, preferably, the radial holes 32d are not arranged at symmetric positions with respect to the center axis of the shaft 23.

Although in the present modification, the description has been given of a case where a plurality of radial holes 32d is provided in the circumferential direction of the bearing portion 32, the plurality of radial holes 32d may be provided in the axial direction of the shaft 23. In this case, the area where the exhaust gas passing through the radial holes 32d presses the shaft 23 is increased, and thus the pressing force in a given direction is further raised. Namely, it is possible to further suppress the vibration of the shaft 23 by increase in a frictional force.

In the embodiment described above, the description has been given of the bearing portions 22 and 32 for operating the valve 16 which opens and closes the exit end 18a of the bypass flow path 18. However, as long as the bearing hole 22a has a configuration of penetrating the inside and outside of the housing in the turbocharger C, the embodiment described above may be applied to a member for supporting another shaft.

Specifically, for example, the embodiment described above can also be applied to the bearing portion of a shaft for opening and closing a bypass flow path which bypasses an intake flow path provided in the compressor housing 6.

Furthermore, when a turbocharger is a twin scroll-type turbocharger, the embodiment described above can also be applied to the bearing portion of a shaft for adjusting the flow rate of exhaust gas flowing into one turbine scroll flow path and the flow rate of exhaust gas flowing into the other turbine scroll flow path.

Moreover, the embodiment described above can also be applied to a multi-stage turbocharger which includes a plurality of turbochargers that is connected in series with or in parallel to the exhaust manifold of the engine. Namely, the embodiment described above may be applied to the bearing portion of a shaft for adjusting the flow rate of exhaust gas flowing into the turbine housing of each of the turbochargers within the multi-stage turbocharger. The embodiment described above can also be applied to a housing (casing) which is coupled to the turbine housing or the compressor housing.

In addition, in the embodiment described above, the cross-sectional area of the radial hole 22d orthogonal to the penetrating direction of the radial hole 22d is set larger than the area of the gap $S_2$. However, the cross-sectional area may be smaller than the area of the gap $S_2$. However, the cross-sectional area of the radial hole 22d orthogonal to the penetrating direction of the radial hole 22d is set larger than the area of the gap $S_2$, and thus it is possible to ensure the flow of the exhaust gas passing from the radial hole 22d and to sufficiently generate the pressing force for pressing the shaft 23.

Although the preferred embodiment of the present disclosure has been described above with reference to the accompanying drawings, it is needless to say that the present disclosure is not limited to such an embodiment. It is clear that a person skilled in the art would be able to conceive various variations and modifications in the scope of claims, and it is understood that they are naturally included in the technical scope of the present disclosure.

What is claimed is:

1. A turbocharger comprising:
   a housing including an internal space formed therein;
   a bearing portion provided in the housing, the bearing portion being provided with a bearing hole penetrating from the internal space of the housing to an outside of the housing;
   a shaft rotatably supported in the bearing hole, including one end protruding more to an inside of the housing than the bearing portion; and
   a valve fixed to the shaft, configured to open and close a flow path opened to the internal space along with rotation of the shaft,
   wherein the bearing portion includes a protrusion portion which protrudes from an inner wall of the housing toward the internal space, and the protrusion portion is provided with a radial hole penetrating in a radial direction of the shaft from an outer circumferential surface of the bearing portion to the bearing hole.

2. The turbocharger according to claim 1,
wherein a cross-sectional area of the radial hole orthogonal to a penetrating direction of the radial hole is larger than a cross-sectional area of a gap, in the radial direction of the shaft, which is formed between an inner circumferential surface of the bearing portion forming the bearing hole and an outer circumferential surface of the shaft.

3. The turbocharger according to claim 1,
wherein the radial hole is provided in a position in which an extension line extending in the penetrating direction of the radial hole does not intersect a movable locus range of the valve.

4. The turbocharger according to claim 2,
wherein the radial hole is provided in a position in which an extension line extending in the penetrating direction of the radial hole does not intersect a movable locus range of the valve.

5. The turbocharger according to claim 1,
wherein the bearing portion is formed in a cylindrical shape,
a plurality of the radial holes is provided at intervals in a circumferential direction of the bearing portion, and
the intervals between the radial holes are non-uniform.

6. The turbocharger according to claim 2,
wherein the bearing portion is formed in a cylindrical shape,
a plurality of the radial holes is provided at intervals in a circumferential direction of the bearing portion, and
the intervals between the radial holes are non-uniform.

7. The turbocharger according to claim 3,
wherein the bearing portion is formed in a cylindrical shape,
a plurality of the radial holes is provided at intervals in a circumferential direction of the bearing portion, and
the intervals between the radial holes are non-uniform.

8. The turbocharger according to claim 4,
wherein the bearing portion is formed in a cylindrical shape,
a plurality of the radial holes is provided at intervals in a circumferential direction of the bearing portion, and
the intervals between the radial holes are non-uniform.

9. The turbocharger according to claim 1,
wherein the protrusion provided on a first end of the bearing portion, and a second end of the bearing portion protrudes to the outside of the housing.

* * * * *